J. H. Manny.
Mower.
Nº 9423
Patented Nov. 23, 1852
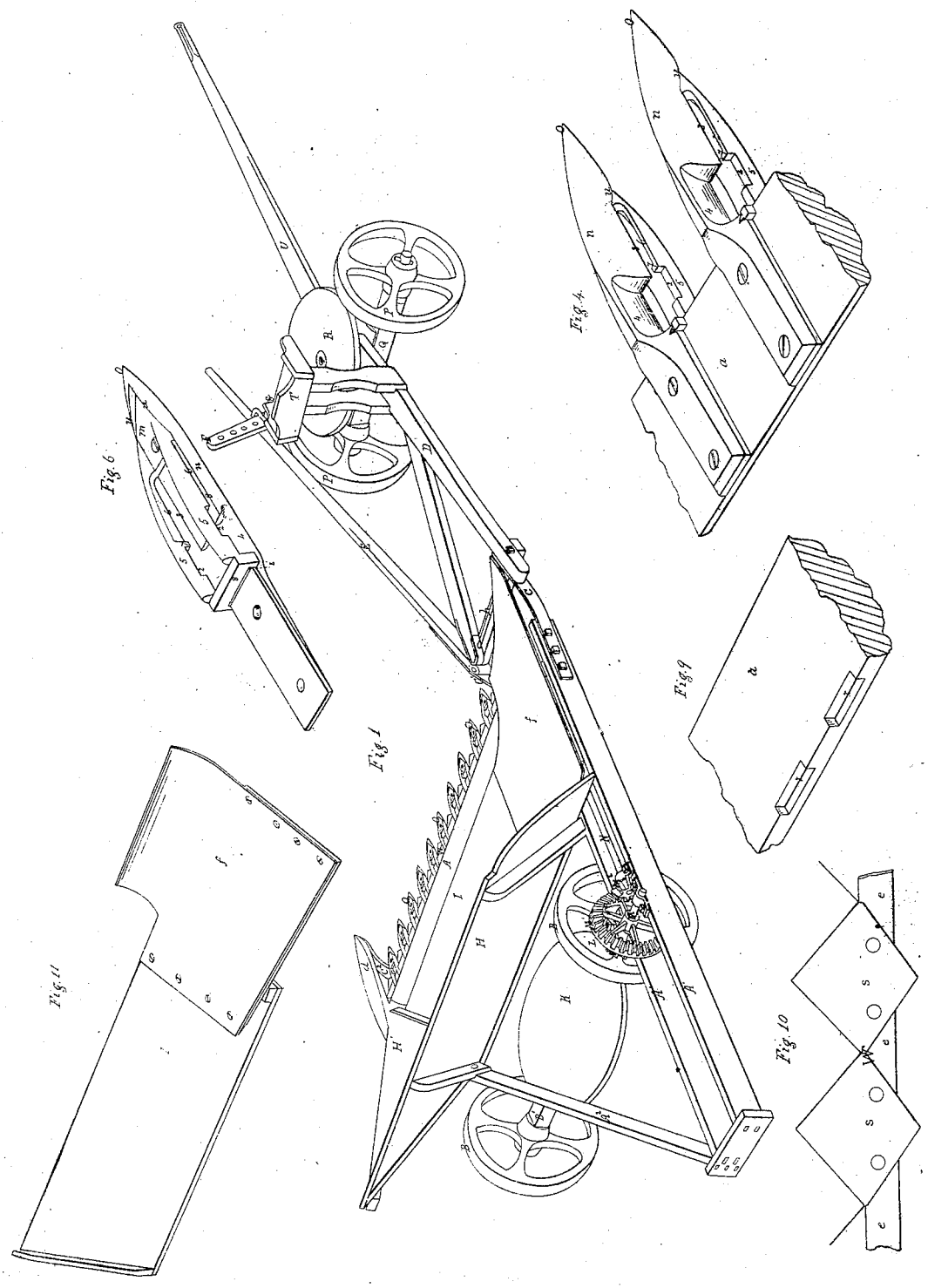

UNITED STATES PATENT OFFICE.

JOHN H. MANNY, OF WADDAM'S GROVE, ILLINOIS.

IMPROVEMENT IN HARVESTERS.

Specification forming part of Letters Patent No. 9,423, dated November 23, 1852; antedated September 17, 1852.

*To all whom it may concern:*

Be it known that I, JOHN H. MANNY, of Waddam's Grove, in the county of Stephenson and State of Illinois, have invented certain new and useful Improvements in Machines for Mowing Grain and Grass, of which the following is a full, clear, and exact description, reference being had to the accompanying drawings, which make part of this specification, and in which—

Figure 1 represents a view in perspective of my improved machine fitted with a raking-platform to adapt it to the mowing of grain. Fig. 2 represents a plan of the same fitted for mowing grass, the raking-platform being removed and a scraper inserted at the end of the machine that runs next the standing grass, to remove the cut grass from a narrow strip for the driving-wheel to run on while cutting the succeeding swath. Fig. 3 represents a view in perspective of a fragment of the finger-bar with its fingers and the sickle detached from the machine. Fig. 4 represents a similar view of the finger-bar and fingers turned bottom uppermost. Fig. 5 represents a transverse section of the finger-bar at the line $x$ $x$ of Fig. 3. Fig. 6 represents a view in perspective of one of the fingers detached; Fig. 7, a like view of the under part, and Fig. 8 of the upper part, of the same. Fig. 9 is a view in perspective of a fragment of the finger-bar, (seen on the under side,) the fingers being removed. Fig. 10 represents a plan of the under side of the sickle. Fig. 11 represents a view of the removable bottom or raking-platform detached from the frame. Fig. 12 is a view in perspective of the scraper.

My invention and improvements relate to the frame of the machine, to the truck by which it is drawn, to the mode regulating the height of the cut from the ground, to the construction of the cutting apparatus, and to the arrangement of the wheel which carries the outer end of the platform and drives the cutter, with respect to a scraper for clearing the cut grass off the track next the standing grass in such manner that the track cleared by the scraper during the cutting of one swath shall be run upon by the driving-wheel while the next swath is being cut.

The frame A A' A², which carries the cutting apparatus, is in the form of a triangle supported horizontally upon a pair of wheels, B, whose axle B' is placed beneath those sides of the frame which correspond to the perpendicular A' and hypotenuse A² of the triangle at about the middle of the perpendicular and parallel to the side A corresponding to the base, which goes forward and either constitutes the finger-bar or supports the same. The advantage of this arrangement of the frame is that neither end of the finger-bar is liable to sag below the other, beyond what is due to the flexibility of the materials of the frame, even if the latter be raised, lowered, and drawn by one corner. A strong bar of iron, C, is firmly attached to the forward extremity of the side A' of the triangular frame. It projects forward of the same and bends upward, in the manner of a runner of a sleigh. A second bar of iron, C', similar to that just mentioned, is firmly secured to the front side, A, of the frame at a short distance within its outer end. This second bar of iron is parallel to the first, and projects forward and bends upward to the same extent. At the inner end of the frame, where the sides A and A² meet, a third bar of metal C², is firmly secured to the side A. It is similar in form to the bars C C', and stands parallel therewith. Its forward extremity is connected with the corner of the frame by a cap, $d$, which tapers to a point in order to enter freely among the standing grain or grass and divide that which is to be cut in the swath in which the machine is advancing from that which is to be left standing to be cut in the next swath. The front extremities of the bars C C' have eyes made through them to receive a horizontal rod, $b$, which passes through the rear or forked extremity of the draft-bar or reach D, and forms a hinge on which the same turns to allow the front of the frame A to rise and fall. The front extremity of this draft-bar is connected to the truck by means of a king-bolt which passes through and secures it in the usual manner.

The iron bar C' has a long lever rigidly attached to it which extends forward to a standard, F, erected upon the platform of the truck. A staple on the side of the forward end of the lever E embraces the standard F, which has a vertical row of holes through it, in any one of which a pin, $c$, may be placed to hold the lever at the required elevation. The office of this lever is to hold the cutter at the proper distance from the ground to cut grain or grass at the proper height.

It is obvious that the lever E may be attached to any convenient part of the frame A and thence extend to the truck; but I prefer to attach it to either the bar C or to the front part of the outer end of the frame A.

A fence-board, H, extends across the frame A parallel to the base, and at a distance therefrom equal to the length of the longest stalks to be cut. This fence-board is supported by standards $e$ behind it. A second fence-board, H', is secured to the diagonal side $A^2$ of the frame to prevent the cut grain from falling over the inner end of the machine.

The space between the fence-board and the front bar of the frame is fitted with a removable bottom or raking-platform, I, which is inserted when cutting grain or other crops which it is desired to deliver from the machine in bundles, ready to tie into sheaves. As fast as the grain is cut it falls back upon this platform, where it is allowed to accumulate until a sufficient quantity to form a sheaf has been deposited, when it is swept off by an attendant with a stroke of his rake. The outer end, $f$, of this platform or bottom is inclined upward and extends over the crank and beyond the side of the frame and driving-wheel, so that when the raker discharges the grain it will clear the machine and be at a sufficient height to drop in a heap, instead of being scattered, as it would be if pushed off the end of a low platform, which would allow the lower portion of the bundle to strike the ground before the upper portion has left the machine. This platform is held in place by hanging its inner end to the diagonal bar of the frame by means of a hook, hasp, button, or other device that will admit of its being readily unfastened for removal, and its outer end is fitted into the frame in such manner that it will lie steadily in place, and simply requires to be raised up to remove it. The outer end of this platform should be made of sheet metal and secured to the other part, as represented in Fig. 11. The sheet metal, being smooth and not liable to be roughened by the teeth of the rake, is preferable to wood.

When mowing grass or other crops which it is desirable to spread over the surface of the ground, the platform or raking-bottom I of the frame is removed and the cut stalks fall back over the cutter and the finger-bar directly upon the ground, instead of being received upon the platform, as in the former case. Whenever the platform is thus removed a board or scraper, J, should be hinged, as represented in Fig. 2, near the inner end of the finger-bar A, in such manner that its lower edge will drag upon the ground and be free to rise and fall to accommodate itself to the inequalities thereof. This board stands parallel to the diagonal bar of the frame, and therefore obliquely to the direction in which the machine is moving. The forward extremity of the board runs between the standing and cut grass, while its hinder extremity extends laterally over the ground which the cut grass occupies a distance at least equal to the width of the track of the driving-wheel, in order that, like the mold-board of a plow, it may in moving forward turn aside the grass and leave a slip of uncovered stubble for the driving-wheel to run on instead of running on the cut grass, which it would have to do if a track was not cleared for it by the scraper J, and it was not placed in the new position in which I have arranged it, so as to run in the track thus cleared.

A further advantage which results from this arrangement of the wheel and scraper is that the track cleared for the wheel to run on will leave the outer end of the cutter and the connecting-rod and crank N' free from danger of becoming entangled in the cut grass.

A platform, K, is placed upon the central part of the axle B' of the supporting-wheels B for the raker or attendant to stand upon to perform his duty. The wheel B next the side A' of the frame supports the greater part of the weight of the latter, and is made to actuate the sickle W through the intervention of suitable gearing, a crank, and connecting-rod. The first wheel, L, of this gearing is secured to the outside of the driving-wheel and concentric with the axle of the same. This gear-wheel L takes into and drives a pinion, L', on the counter-shaft M, to rotate the same. This shaft carries the bevel-wheel M', and the latter meshes into a bevel-pinion, $M^2$, which is mounted on the crank-shaft N, to which it communicates a rapid rotary motion. The counter-shaft M rests in bearings on the two sides of the frame-beam which forms the side A' of the triangular frame, and the crank-shaft N is supported in the bearings formed in the cross-pieces that unite the sides of this beam. The crank N' is either formed in one piece with the shaft N that carries it, or is made separate and keyed or otherwise secured to the shaft; but the former mode is preferable, as then the crank is in no danger of being jarred loose. The connecting-rod $N^2$ should have a strong and well-fitted eye at each end—the one to receive a crank-pin, and the other for the joint-pin that connects it with the sickle-bar $c$ to pass through.

The sickle is composed of a strong straight bar or back, $e$, and a series of lozenge-shaped teeth, $s$, secured thereto by rivets or screws. Each tooth should be made of a plate of good and well-tempered steel, about one-eighth of an inch in thickness and four inches long, with its four edges sharpened by beveling them off in the manner of a joiner's chisel, and sickling the beveled side, as represented in Fig. 3. These lozenge cutters $s$ are of a form that would be produced by placing two isosceles triangles, of equal base and unequal height, base to base, the triangles being so proportioned that the diagonal of the lozenge which corresponds to the bases of the triangles is the longest.

The teeth thus formed are arranged on the lower side of the bar $e$, with their longest diagonals coinciding with its front edge and their beveled edges uppermost, and in this position are secured to the bar by two rivets or screws passing through holes in each of them and through corresponding holes in the bar. The points and cutting-edges of the teeth, formed and arranged in this manner, will project on both sides of the bar $e$, but most on the front side, and will thus form a double-edged cutter, the teeth in front of the bar being designed to cut the stalks of the standing grain or grass, and the teeth behind it being for the purpose, among other things, of cutting off wire-grass or other fibrous matters that get lapped about the cutter-bar or entangled in the fingers, and which tend so much to retard and clog the operation of the single-edged cutter.

The form and proportions of the cutter, above given, are those which I have essayed with success, and which I believe to be the best; but I do not confine myself to those proportions, nor to the precise arrangement or construction of the parts, as they may be greatly varied within the principle of my invention, and although it is a matter of conveniece in making, and affords great facilities for repairs, to make the serrated blade of separate teeth, yet, if preferred, the blade may be made in a single piece, and the teeth formed by forging, filing, or otherwise, at the option of the constructor. The sickle or cutter thus formed runs through and acts in concert with a series of guard-fingers, O, secured to and projecting forward into the standing grain or grass from the front side of the finger-bar $a$. These fingers range in a line with the runners $C$ $C'$ $C^2$, that when running on the ground they may rise more freely over obstructions.

To facilitate the rising of the fingers over inequalities of the surface of the ground their front ends turn upward. Where the flat side of the teeth of the sickle pass over the edges of the fingers the latter have sharp corners, so that the combined action of the sickle and fingers will be to sever the stalks by a shearing cut. These fingers may be made of cast or malleable iron, and they consist of two parts or halves, the uppermost of which, $m$, is an open frame to facilitate the discharge of obstructions that always work in between the top of the sickle and the opening of the finger. The under part, $n$, of the finger is a strong pointed bar. These two are united at their front end by fitting them together and passing a screw or rivet through them, and at the rear end they are united by letting the upper half, $m$, into a notch, $x$, Fig. 9, in the finger-bar $a$, and clamping the under piece, $n$, firmly upon it and to the bar by screws passing through the shank of the said under part, $n$. A piece of leather or other packing, $i$, is placed between the two parts of each finger in such manner that it can be removed to bring the two parts nearer together to compensate for their wear and that of the knife. The upper surface of the front extremity of the lower part, $n$, of the finger has raised flanges $u$ on its edges, or a depression sunk in its surface, by which means the two parts are united without making a horizontal joint in front that would catch fine grass, &c., the accumulation of which would greatly obstruct the action of the finger, whose duty can only be performed properly when it is clear of obstructions of this kind, so as to enter freely between the stalks of grain or grass and divide without overriding or breaking them down. The finger has a long, narrow horizontal opening or slot through it, with a recess or notch, 2, in the upper side of the opening and toward the rear end of the same to admit the cutter-bar $e$. The narrower portion of the slot before and behind this recess or enlargement is for the teeth or blade $s$ to play in. The corners 3 of the lower portion of the finger are made smooth and sharp to act in connection with the flat side of the teeth to cut or sever the stalks. The notch or recess 4 in each side of the lower part, $n$, of the finger is to assist the working out of gum, grit, and fibers, or other obstructions that may get under the blade. The inner corners of the side bars, 5, of the upper part of the finger are chamfered off, so as to make their lower edges, 6, overhang the outer or cutting edges, 3, of the lower part, $n$, of the finger to facilitate the discharge of any obstruction that may get into the opening between the bars 5. This chamfering or beveling of the inside of the side bars, 5, of the finger stops short of the notch 2 that receives the cutter-bar $e$, so as to leave a boss or stud, 7, that tends to prevent the fibers that lap round the bars 5 from working into the joint between the bar $e$ and sides of the notch 2. The fingers thus constructed, when seen from above, appear to consist of a stout central bar, $n$, and a more slender one, 5, on each side of it, the three springing from the finger-bar $a$ and meeting in front of it in a point. The finger-bar in this instance is simply a stout bar of wood rounded on the upper and flat on the under side, with a series of notches, $x$, in the front edge of its flat side to receive the inner extremities, 8, of the upper part of the finger to steady and assist in holding the same. When the cutter is placed in the fingers and moved back and forth by the crank each of its teeth $e$ will pass from the middle of one finger to the middle of the adjacent finger and back again alternately, so that the teeth will press the stalks alternately toward and from each side of the fingers. If it would be deemed advisable, each stroke of the sickle might be long enough to cause each of its teeth to pass and repass through two or more of the fingers.

A revolving reel may be used to press the grain or grass against the cutter and turn it over upon the platform or the ground, as the case may be. As the construction and mode of operating the reel are well known, and as I do not propose to make or use it differently from others, a particular description of it is here unnecessary.

The truck by which the triangular frame, with its cutting mechanism, is drawn consists of a pair of wheels, P, and an axle, Q, that support a platform or foot-board, R.

The front end of the draft-bar or reach D, by which the truck and the triangular frame A are united, is fastened to the platform R by a king-bolt, $r$, which also forms the pivot on which the axle Q of the truck turns. The platform R is fitted with a seat, T, for the director of the machine.

A pole, U, for harnessing the horses to for propelling the machine, extends from the front of the truck, to which it is connected in the usual manner.

When mowing grass or grain which is required to be cut very close to the ground, the pin $c$, by which the lever E is held up, is withdrawn from the standard, and the fingers O and the runners C C' C² are suffered to bear on the surface of the ground, to whose inequalities they will conform by rising and falling. In this way grass can be cut closer and more evenly than is usually done by hand. It is safe thus to allow the cutter to run near the ground, because the director, being on the truck so far in advance, can see any obstruction in time to raise the cutter until it is passed, and if he should not happen to see it and it should come in the line of either of the runners it could not do any harm, and if it should meet the fingers the chances of injury are greatly diminished, because the machine is free to rise and fall. The hinge by which the triangular frame is raised and lowered being, in this instance, the horizontal bolt $b$, that connects the front of the runners to the reach D, is far enough elevated above the surface of the ground to free it from danger of entanglement with the cut grain or grass.

The person whose duty it is to rake the cut grain off the bottom I stands, as has been stated, upon the platform K, with his face toward the front of the machine, and holding a rake or fork in his hand. With a single sweep from the inner to the outer end of the bottom I he pushes the cut grain off in a bundle, and this operation he repeats as often as the requisite quantity of grain has been gathered upon the platform.

A common clutch may be used to connect and disconnect the train of gearing for operating the sickle from the driving-wheel, so that while the machine is drawn toward and from its work the sickle and gearing may remain at rest.

The modifications of which any part of the machine is susceptible are very numerous indeed, in order to adapt it to special circumstances or to make it conform to the views of different constructors; but these changes I deem it unnecessary to specify, as such of them as are important will naturally occur to every intelligent constructor.

Having thus described my improvements and indicated some of the modifications of which they are susceptible, what I claim as my invention, and desire to secure by Letters Patent, is—

1. The arrangement of the track-scraper and driving-wheel in such manner that the latter, while the machine is cutting one swath, will run in the track cleared by the former when the machine is cutting the previous swath, as herein set forth; but in this patent I make no claim whatever to the track-scraper itself.

2. The projections 7 on the under side of the upper bars, 5, of the finger, in combination with the chamfer or recess on the lower inside corners of said bars to counteract the tendency of wire-grass and other fibrous obstructions to pass in between the cutter-bar $e$ and the sides of the recess in the upper part of the finger in which it is guided.

3. Forming the guard-fingers O of two parts, $m$ and $n$, interlocked at the point, substantially as herein set forth, so that grass cannot lodge in the joint and form an impediment to their entering between the stalks of the standing grain.

4. In combination with a raker's stand or seat, a removable platform or raking-bottom constructed with a wing that extends from the outer end of the cutter over the frame and holds up the butts of the straws above the stubble, which otherwise would obstruct the discharge of the grain from the platform, substantially as herein set forth.

In testimony whereof I have hereunto subscribed my name.

JOHN H. MANNY.

Witnesses:
P. H. WATSON,
E. P. RENWICK.